United States Patent
Jia et al.

(10) Patent No.: US 12,547,047 B1
(45) Date of Patent: Feb. 10, 2026

(54) FREQUENCY-COMB SOURCE AND GENERATION AND METHOD

(71) Applicant: CABLE TELEVISION LABORATORIES, INC., Louisville, CO (US)

(72) Inventors: Zhensheng Jia, Superior, CO (US); Haipeng Zhang, Broomfield, CO (US); Junwen Zhang, Shanghai (CN); Mu Xu, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1141 days.

(21) Appl. No.: 17/513,424

(22) Filed: Oct. 28, 2021

Related U.S. Application Data

(60) Provisional application No. 63/106,674, filed on Oct. 28, 2020.

(51) Int. Cl.
  *G02F 1/35* (2006.01)
  *G02F 1/365* (2006.01)

(52) U.S. Cl.
  CPC .......... *G02F 1/354* (2021.01); *G02F 1/365* (2013.01); *G02F 2203/56* (2013.01)

(58) Field of Classification Search
  CPC ...... G02B 6/12004; G02B 2006/12147; G02B 6/12007
  See application file for complete search history.

(56) References Cited

U.S. PATENT DOCUMENTS

| | | | | |
|---|---|---|---|---|
| 5,822,355 A | * | 10/1998 | Ahn | H01S 3/1109 372/18 |
| 7,603,016 B1 | * | 10/2009 | Soref | B82Y 20/00 385/129 |
| 9,252,561 B2 | * | 2/2016 | Fermann | H01S 3/1115 |
| 9,268,195 B1 | * | 2/2016 | Camacho | G02F 1/3536 |
| 12,288,959 B2 | * | 4/2025 | Roslund | H01S 3/06791 |
| 12,301,289 B1 | * | 5/2025 | Jia | H04B 10/63 |
| 2003/0231826 A1 | * | 12/2003 | Boyd | G02B 6/122 385/27 |
| 2012/0012811 A1 | * | 1/2012 | DeFlumere | G02B 5/122 438/93 |

(Continued)

FOREIGN PATENT DOCUMENTS

| | | | | |
|---|---|---|---|---|
| CN | 114167555 A | * | 3/2022 | ............ H04B 10/40 |
| EP | 0859266 A2 | * | 8/1998 | ........... H04B 10/506 |

OTHER PUBLICATIONS

M. Piccardo, F. Capasso, Laser Frequency Combs with Fast Gain Recovery: Physics and Applications. Laser & Photonics Reviews 2022, 16, 2100403. https://doi.org/10.1002/lpor.202100403 (Year: 2022).*

(Continued)

*Primary Examiner* — Tanya T Motsinger
(74) *Attorney, Agent, or Firm* — Cozen O'Connor

(57) ABSTRACT

A method for generating an optical frequency comb includes generating a first optical frequency comb spanning a first optical bandwidth and including a first plurality of frequency tones spaced by a free-spectral range. The method also includes generating an additional optical frequency comb from a first frequency tone of the first plurality of frequency tones.

13 Claims, 7 Drawing Sheets

(56) References Cited

U.S. PATENT DOCUMENTS

| | | | | |
|---|---|---|---|---|
| 2012/0039560 A1* | 2/2012 | Mazur | ............ | G02F 3/024 |
| | | | | 385/2 |
| 2012/0320936 A1* | 12/2012 | Saadany | ............ | H01S 5/141 |
| | | | | 372/20 |
| 2016/0124285 A1* | 5/2016 | Lowell | ............ | H01S 3/005 |
| | | | | 359/326 |
| 2016/0336718 A1* | 11/2016 | Takabayashi | ............ | H01S 5/0078 |
| 2019/0072672 A1* | 3/2019 | Yao | ............ | G01S 7/4814 |
| 2020/0076149 A1* | 3/2020 | Papp | ............ | G02F 1/0344 |
| 2020/0381896 A1* | 12/2020 | Murao | ............ | H01S 5/50 |
| 2021/0072616 A1* | 3/2021 | Zhang | ............ | G02F 1/365 |
| 2021/0318111 A1* | 10/2021 | Vakoc | ............ | G01B 9/02091 |
| 2022/0102930 A1* | 3/2022 | Nakamura | ............ | H01S 3/0092 |
| 2022/0113606 A1* | 4/2022 | Lee | ............ | H04B 10/90 |
| 2022/0123516 A1* | 4/2022 | Guo | ............ | H01S 3/1109 |
| 2023/0274156 A1* | 8/2023 | Hamerly | ............ | G06N 5/04 |
| | | | | 706/25 |
| 2024/0004264 A1* | 1/2024 | Cheng | ............ | G02F 1/365 |
| 2025/0076591 A1* | 3/2025 | Tanaka | ............ | G02B 6/1228 |

OTHER PUBLICATIONS

T. J. Kippenberg et al., Microresonator-Based Optical Frequency Combs.Science332,555-559(2011). DOI: 10.1126/science.1193968 (Year: 2011).*

* cited by examiner

900⎯

910
Generate a first optical frequency-comb spanning a first optical bandwidth and including a first plurality of frequency tones spaced by a free-spectral range.

912
Exciting a plurality of cavity modes of an optical ring resonator formed at least in part from a third-order nonlinear optical material.

920
Generate an additional frequency comb from a first frequency tone of the first plurality of frequency tones.

921
Generate, from each of the first plurality of frequency tones other than the first frequency tone, a respective one of a plurality of second optical frequency combs

922
Couple the first optical frequency-comb to an input port of an electro-optic frequency-comb source.

924
Drive an electro-optic modulator of the electro-optic frequency-comb source with a periodic signal having a modulation frequency that is a unit fraction of the free-spectral range.

926
Amplify the first optical frequency-comb to yield a first plurality of amplified frequency tones.

928
Generate, from each of the first plurality of amplified frequency tones, a respective one of the plurality of second optical frequency-combs.

FIG. 9

FREQUENCY-COMB SOURCE AND GENERATION AND METHOD

CROSS-REFERENCE TO RELATED APPLICATIONS

This application benefits from and claims priority to U.S. provisional patent application Ser. No. 63/106,674, filed on Oct. 28, 2020, the disclosure of which is incorporated herein by reference in its entirety.

BACKGROUND

An optical frequency-comb source can simultaneously generate a number of precisely spaced and equally spaced information carriers that share a strong phase correlation. Optical frequency-comb sources have many applications, such as spectroscopy, optical frequency metrology, ranging, millimeter wave and terahertz signal generation, microwave photonics, and optical fiber communications. Several effective optical frequency-comb source generation technologies have been developed. These include mode-locking, Kerr-effect in microresonators, parametric processes, electro-optic modulation, and gain switching. Many parameters will impact the quality and performance for different applications with different technology implementations. For applications in optical communication systems, several parameters that determine the flexibility, modulation formats, ITU-grid compatibility, and baud rates that can be employed for dense wavelength-division multiplexing (DWDM) transmission systems. These parameters include optical bandwidth or the total width of the optical spectrum obtained from the optical frequency combs, spectrum flatness, optical power per comb line, and frequency or optical tone spacing.

SUMMARY OF THE EMBODIMENTS

Advantages of electro-optic modulation schemes include high repetition rates, intrinsic mutual coherence, flexible tunability, and high power per comb line. An electro-optic optical frequency-comb source may include a laser in CW operation passed through one or multiple electro-optic modulators non-linearly driven by large-amplitude sinusoidal RF signals. This large signal modulation introduces higher-order modulation harmonics of the driving RF signal around the optical frequency defined by the input laser. The generated optical frequency comb may have a narrow bandwidth and a low degree of flatness, as the generated harmonics present irregular amplitude distribution conforming to Bessel functions.

Kerr optical frequency-comb sources in compact integrated microresonators generate ultra-broadband coherent combs while conserving a low linewidth. The underlying generation process is the nonlinear Kerr effect in the microresonator that occurs when a high-power optical signal (known as pump) is launched. The optical Kerr effect enables the formation of new frequency components via variation in the resonator material's refractive index, where the variation is proportional to the confined pump intensity. The optical spectrum may expand over hundreds of nanometers and span multiple telecommunication bands. Another optical frequency-comb source approach showing similar performance is mode-locked laser. It includes an optical frequency comb with comb tones spaced by the frequency spacing between the longitudinal modes, which is determined by the laser cavity length. However, frequency spacing determined by the resonator cavity is fixed and too large to be applicable and compatible for ITU-grid multiplexing optical communication systems.

Embodiments disclosed herein include a new optical frequency-comb source scheme that cascades an ultra-broadband covering optical frequency-comb source and an electro-optic frequency-comb source. Each frequency-comb generation technique offers its own desirable qualities and constraints. The combined system can provide not only the broad optical bandwidth (such as the fiber C and L transmission band) but also tunable ability for narrow frequency spacings (such as 25/50/75/100 GHz ITU-grid). The phase correlation and low phase noise in the first stage can be maintained in the electro-optic modulation process. This multi-stage optical frequency-comb generation process may also be integrated into a monolithic or heterogenous device to increase operation stability and reduce power consumption.

In a first aspect, a method for generating an optical frequency comb includes generating a first optical frequency comb spanning a first optical bandwidth and including a first plurality of frequency tones spaced by a free-spectral range. The method also includes generating an additional optical frequency comb from a first frequency tone of the first plurality of frequency tones.

In a second aspect, a multi-stage optical frequency-comb source includes a first optical frequency-comb source and a second optical frequency-comb source. The first optical frequency-comb source generates a first optical frequency comb that includes a plurality of first optical frequency tones. The second optical frequency-comb source is in optical communication with an output port of the first optical frequency-comb source and generates a respective second optical frequency comb from each optical frequency tone of the plurality of first optical frequency tones.

In a third aspect, an optical frequency-comb source includes an optical resonator, a first active-region waveguide, and a second active-region waveguide. The first active-region waveguide is formed of a first gain medium and is optically coupled to an entrance port of the optical resonator. The second active-region waveguide is formed of a second gain medium and is optically coupled to an exit port of the optical resonator.

BRIEF DESCRIPTION OF THE FIGURES

FIG. 9 is a flowchart illustrating a method for generating an optical frequency comb, in an embodiment.

DETAILED DESCRIPTION OF THE EMBODIMENTS

Figure 1:
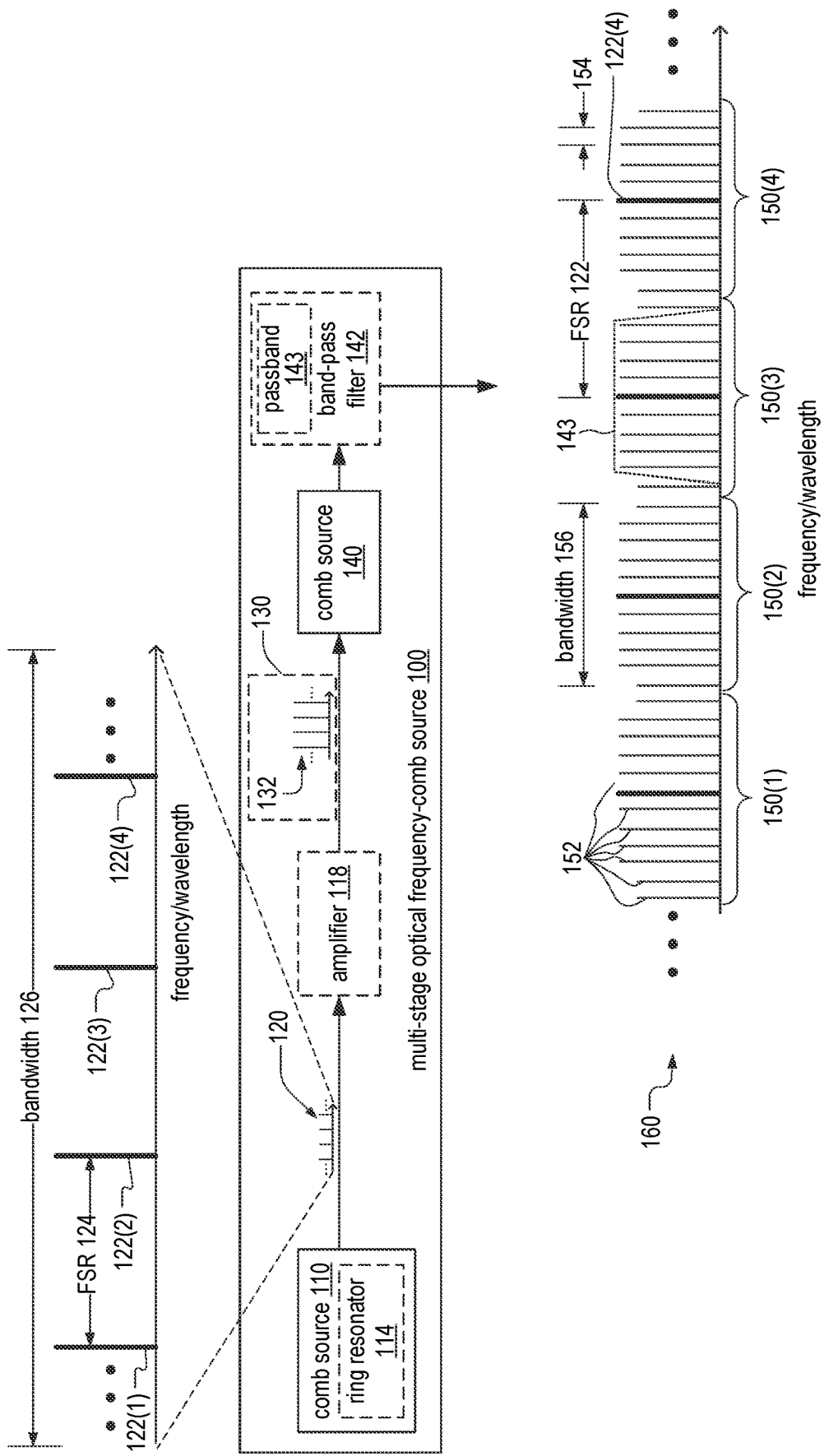
FIG. 1 is a schematic of a multi-stage optical frequency-comb source, in an embodiment.

FIG. 1 is a schematic of a multi-stage optical frequency-comb source 100, hereinafter multi-stage comb source 100. Multi-stage comb source 100 includes an optical frequency-comb source 110 and an optical frequency-comb source 140, hereinafter comb source 110 and comb source 140 respectively. Comb source 110 generates an optical frequency comb 120. Optical frequency comb 120 spans an optical bandwidth 126 and includes a plurality of frequency tones 122 (k) spaced by a free-spectral range (FSR) 124, where index k is an integer. Frequency tones 122 (k) may be equally spaced in the frequency domain. FIG. 1 illustrates four frequency tones 122 indexed by index values k=1 through k=4. Comb source 140 is in optical communication with, e.g., optically coupled to, an output port of comb source 110 and generates a respective optical frequency comb 150 (k) from each frequency tone 122 (k). Optical frequency comb 120 and optical frequency combs 150 collectively form an optical frequency-comb 160. Herein, the terms "in optical communication with" and "optically coupled to" are used interchangeably and are synonymous.

Each optical frequency comb 150 has an optical bandwidth 156. In embodiments, optical bandwidth 156 is less than FSR 124, such that adjacent optical frequency combs 150 do not overlap, which may result in interference between tones of the same frequency and decrease the flatness of optical frequency-comb 160. Each optical frequency comb 150 includes a plurality of frequency tones 152, which are spaced, e.g., equally spaced, by a frequency spacing 154. In embodiments, frequency spacing 154 equals a unit fraction of free-spectral range 124, such that a frequency difference between each frequency tone 152 and the most proximate frequency tone 122 thereto is also frequency spacing 154. A unit fraction is a fraction with one in the numerator and an integer in the denominator, such as ½, ⅓, ¼, etc. In embodiments, the unit fraction does not exceed one-half of free-spectral range 124, which excludes the unit fraction equal to one (one divided by one), such that each frequency tone 152 is most proximate in frequency to the optical frequency tone 122 from which it was generated.

In embodiments, comb source 110 includes an optical resonator 114. Optical resonator 114 may include a closed-loop waveguide formed at least in part from a third-order nonlinear optical material. A cross-sectional shape of closed-loop waveguide may be any closed path, such as a circle, an ellipse, or a stadium ("racetrack").

In embodiments, comb source 140 is an electro-optic frequency-comb source, which may include a radio-frequency source coupled to a Mach-Zehnder modulator. Advantages of electro-optic frequency-comb sources include tunability of both the number of frequency tones 152 and frequency spacing 154. The Mach-Zehnder modulator may include a phase modulator optically coupled to a Mach-Zehnder interferometer.

The Mach-Zehnder interferometer may be a dual-drive Mach-Zehnder interferometer, which includes multiple interference arms that each include a respective phase modulator. An advantage of a dual-drive MZM is that non-flat optical spectra obtained from each phase modulator in the interferometric arms may be modified to become complementary by adjustment of amplitudes, frequencies and phases of the modulating signal applied, resulting in a combined flat optical comb spectrum.

In embodiments, multi-stage comb source 100 includes an amplifier 118 that is in optical communication with an output port of comb source 110 and coupled to an input port of comb source 140. Amplifier 118 may be one of a semiconductor optical amplifier, an erbium-doped fiber amplifier and a Raman amplifier. Amplifier 118 receives optical frequency comb 120, and outputs an optical frequency comb 130, which includes a plurality of amplified optical frequency tones 132. In such embodiments, optical frequency-comb source 140 generates optical frequency-comb 160 from optical frequency comb 130.

In embodiments, multi-stage comb source 100 includes a band-pass filter 142 for increasing the flatness of optical frequency-comb 160. Here, flatness refers to the uniformity of amplitudes of frequency tones 122 and 152. Band-pass filter 142 has a passband 143, which is superimposed on optical frequency comb 150(3). Band-pass filter 143 may be a periodic filter, such that each of a plurality of passbands 143 are spaced at a period equal to FSR 122 and is centered on a respective frequency tone 122. Band-pass filter 142 may be part of comb source 140.

A spectral width of passband 143 may equal to, or be defined similarly to optical bandwidth 156. For example, at least one of bandwidth 156 and passband 143 may be defined by requiring that amplitude of each frequency tone 152 to exceed a fraction of the amplitude of a frequency tone 122, or an average amplitude of frequency tones 122. The fraction is, for example, between one-half and nine-tenths, depending on the flatness tolerance for a given application. In the example of FIG. 1, passband 143 filters out one frequency tone 152 at both the low-frequency end and the high-frequency end of each optical frequency comb 150.

The frequency spacing of optical frequency combs 120 and 150 may be either decoupled, or be coupled through frequency locking mechanisms. In embodiments, through frequency locking, the spacing of optical frequency comb 120 (FSR 124) may always be an integer multiple (32× for example) frequency spacing 154 of optical frequency comb 150 such that at least one of (i) when FSR 124 changes, frequency spacing 154 changes accordingly, and (ii) when frequency spacing 154 changes, FSR 124 changes accordingly.

Figure 2:
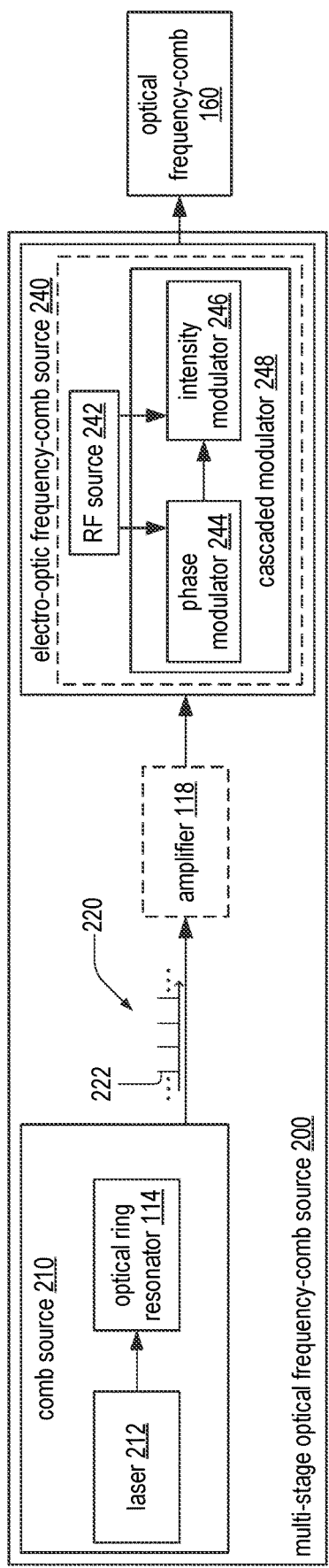
FIG. 2 is a schematic of a multi-stage optical frequency-comb source, which is an example of the multi-stage optical frequency-comb source of FIG. 1.

FIG. 2 is a schematic of a multi-stage optical frequency-comb source 200, which is an example of multi-stage comb source 100. Multi-stage comb source 200 includes a comb source 210 and an electro-optic frequency-comb source 240, which are respective examples of comb source 110 and comb source 140. Comb source 210 includes a laser 212 and optical resonator 114. Examples of laser 212 include a discrete laser and an external cavity laser, either of which may be part of a photonic integrated circuit. Intensity modulator 246 may be a Mach-Zehnder modulator or a ring modulator.

In embodiments, electro-optic frequency-comb source 240 includes an RF source 242 and a cascaded modulator 248, which includes a phase modulator 244 and an intensity modulator 246 optically coupled in series. RF source 242 may be electrically coupled to at least one of phase modulator 244 and intensity modulator 246. Electro-optic frequency-comb source 240 may deploy one of several hardware configurations for electro-optic modulation. For example, electro-optic frequency-comb source 240 may include at least one of (i) a single phase modulator driven with combined RF signals with different amplitudes and frequencies, (ii) cascaded phase modulators (multiple phase modulators optically coupled in series), and (iii) a phase modulator and an amplitude modulator optically coupled in series.

Figure 3:
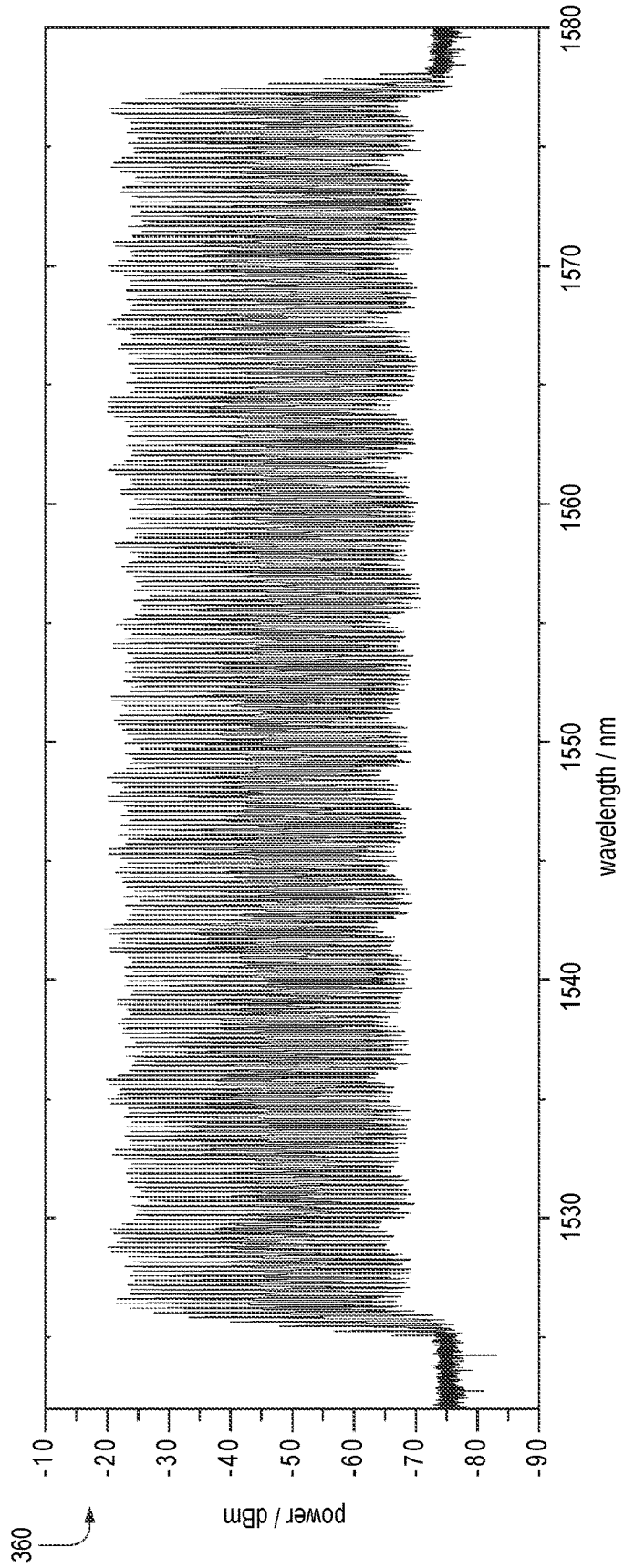
FIG. 3 is a graphical depiction of an optical tone spectrum produced by embodiment of the multi-stage optical frequency-comb source of FIG. 2.

Comb source 210 outputs an optical frequency comb 220 that includes a plurality of optical tones 222. Optical frequency comb 220 and optical tones 222 are respective examples of optical frequency comb 120 and frequency tones 122. Multi-stage comb source 200 outputs optical frequency-comb 160. FIG. 3 illustrates an optical tone spectrum 360, which is an example of optical frequency-comb 160 when the total number of optical tones 222 equals sixteen. Optical tone spectrum 360 has a 25-GHz channel spacing, includes a total of 256 tones, and spans the entire telecom C band (1530-1565 nm) and a portion of the telecom L band (1565-1625 nm).

Silicon photonics benefits from the complementary metal-oxide-semiconductor (CMOS) technology platform, which has dominated the microelectronics industry for over forty years. This is one reason that silicon photonics and photonic integrated circuits have become promising technologies for providing highly integrated and low-cost optical components and systems. Embodiments disclosed herein leverage the vast potential of integrating complex devices and systems on a silicon-on-insulator platform, and are based on a heterogeneously integrated silicon photonics platform with active regions that include a gain medium.

Figure 4:
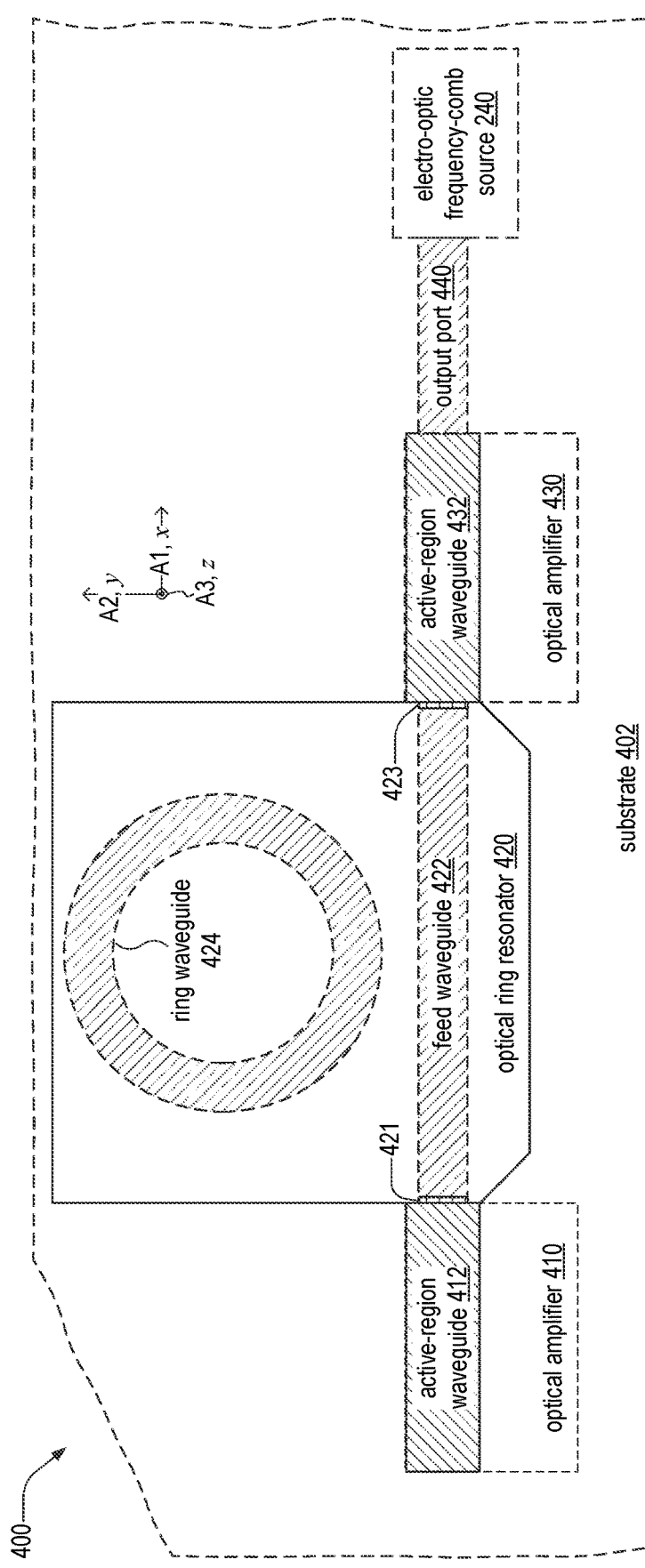
FIG. 4 is schematic plan view and FIG. 5 is a side view of an optical frequency-comb source, which is an example of an optical frequency-comb source of the multi-stage optical frequency-comb source of FIG. 1.
Figure 5:
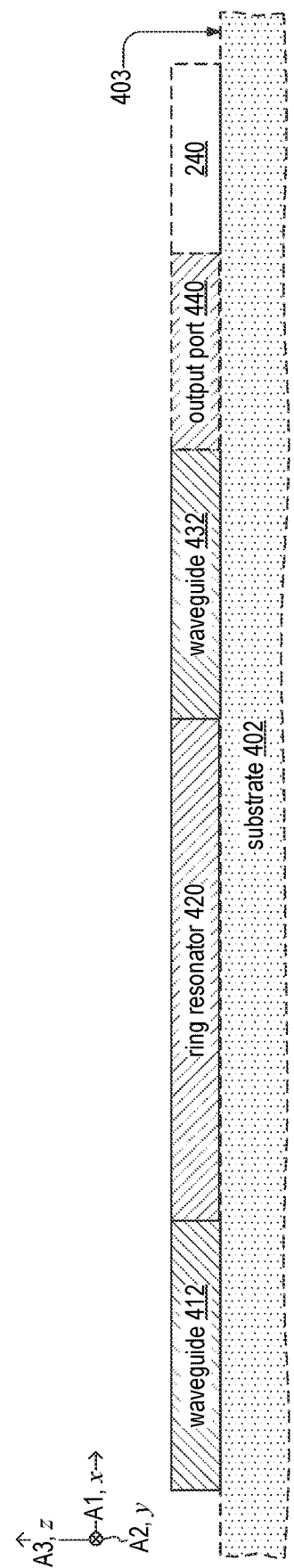

FIG. 4 is a schematic plan view and FIG. 5 is a side view of an optical frequency-comb source 400, which is an example of comb source 110. Optical frequency-comb source 400 includes an active-region waveguide 412, an optical resonator 420, and an active-region waveguide 432.

Optical resonator 420 is an example of optical resonator 114, and may be, or include, at least one of a Fabry-Perot resonator, an etalon, and a microring resonator. Optical resonator 420 may include, or be formed at least part of, third-order nonlinear optical material, which may be one silicon nitride, aluminum nitride, silicon carbide, and magnesium fluoride or a combination thereof.

Optical resonator 420 may include a feed waveguide 422 and a closed-loop waveguide 424 evanescently coupled to feed waveguide 422. In embodiments, closed-loop waveguide 424 is formed at least in part of a third-order nonlinear optical material, which may be one silicon nitride, aluminum nitride, silicon carbide, and magnesium fluoride or a combination thereof.

Active-region waveguide 412 is formed of a first gain medium and is optically coupled to an entrance port 421 of optical resonator 420. Active-region waveguide 432 is formed of a second gain medium and is optically coupled to a exit port 423. When optical resonator 420 includes feed waveguide 422 and closed-loop waveguide 424, waveguide-entrance port 421 and waveguide-exit port 423 are respective ports of feed waveguide 422 and closed-loop waveguide 424.

In embodiments, at least one of the first gain medium and the second gain medium is one of indium phosphide, gallium arsenide, indium gallium arsenide, indium gallium arsenide phosphide, and a combination thereof. In embodiments, feed waveguide 422 is coupled to active-region waveguide 412 and active-region waveguide 432 via a taper/inverted-taper geometry. For example, each of ports 421 and 423 includes an inverted taper region and each of active-region waveguide 412 and active-region waveguide 432 includes a taper region.

In embodiments, optical frequency-comb source 400 includes at least one of (i) an optical amplifier 410 that includes active-region waveguide 412, and (ii) an optical amplifier 430 that includes active-region waveguide 432. In embodiments, each of optical amplifiers 410 and 430 is one of a semiconductor optical amplifier, an erbium-doped fiber amplifier, and a Raman amplifier.

In embodiments, optical frequency-comb source 400 includes electro-optic frequency-comb source 240 optically coupled to active-region waveguide 432. In such embodiments, comb source 400 is an example of multi-stage comb source 100. Optical frequency-comb source 400 may include an output port 440 that optically couples active-region waveguide 432 to electro-optic frequency-comb source 240. Output port 440 may be, or include a semiconductor waveguide, e.g., a silicon waveguide. Active-region waveguide 432 may be coupled to output port 440 via a taper/inverted-taper geometry.

In embodiments, optical frequency-comb source 400 includes a substrate 402. Substrate 402 is formed of an electrical insulator and has a substrate top-surface 403. In such embodiments, at least one of optical resonator 420, active-region waveguide 412, and active-region waveguide 432 is on substrate top-surface 403.

Figure 6:
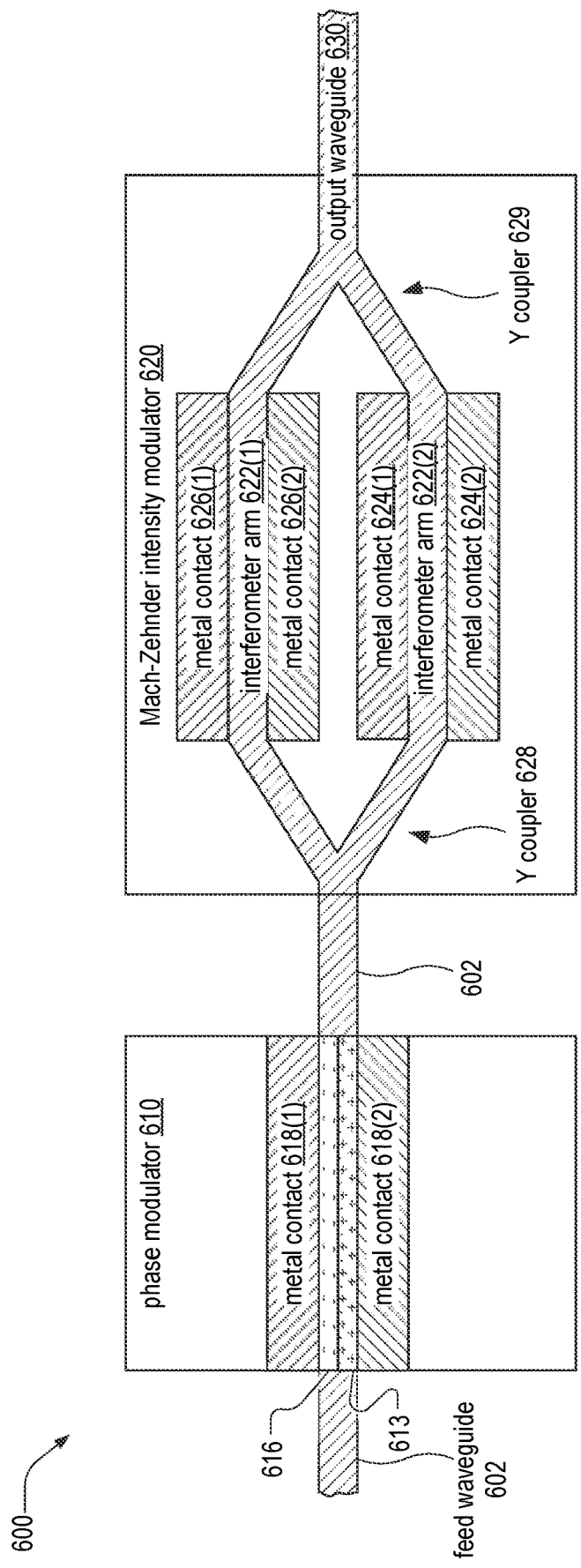
FIGS. 6 and 7 are schematic plan views of respective cascaded modulators, each of which is an example of a cascaded modulator of the multi-stage optical frequency-comb source of FIG. 2, in embodiments.

FIG. 6 is a schematic plan view of a cascaded modulator 600, which includes a phase modulator 610 and a Mach-Zehnder intensity modulator 620 optically coupled in series. Cascaded modulator 600, modulator 610, and modulator 620 are respective examples of cascaded modulator 248, phase modulator 244 and intensity modulator 246 of electro-optic frequency-comb source 240, FIG. 2. Phase modulator 610 includes a pair of metal contacts 618 (1,2), and a feed waveguide 602 therebetween. One of metal contacts 618 functions as an anode while the other of metal contacts 618 functions as a cathode.

Mach-Zehnder intensity modulator 620 includes Y-couplers 628 and 629, metal contacts 626 (1,2), metal contacts 624 (1,2), an interferometer arms 622(1) between metal contacts 626, and an interferometer arm 622(2) between metal contacts 624. Y-coupler 628 couples feed waveguide 602 to each interferometer arm 622. Y-coupler 629 couples each interferometer arm 622 to an output waveguide 630. Between metal contacts 618, feed waveguide 602 includes a positively doped region 613 and a negatively doped region 616 that form a pn junction. In embodiments, (i) one of metal contacts 624 functions as an anode while the other of metal contacts 624 functions as a cathode; and (ii) one of metal contacts 626 functions as an anode while the other of metal contacts 626 functions as a cathode.

In embodiments, cascaded modulator 600 is a silicon photonic device formed on an insulative substrate, such as substrate 402. In such embodiments, feed waveguide 602, Y-couplers 628 and 629, interferometer arms 622, and output waveguide 630 are part of a monolithic volume of semiconductor material, such as silicon, on the substrate. In embodiments, cascaded modulator 600 may include at least one additional phase modulator 610 and/or at least one additional Mach-Zehnder intensity modulator 620.

Figure 7:
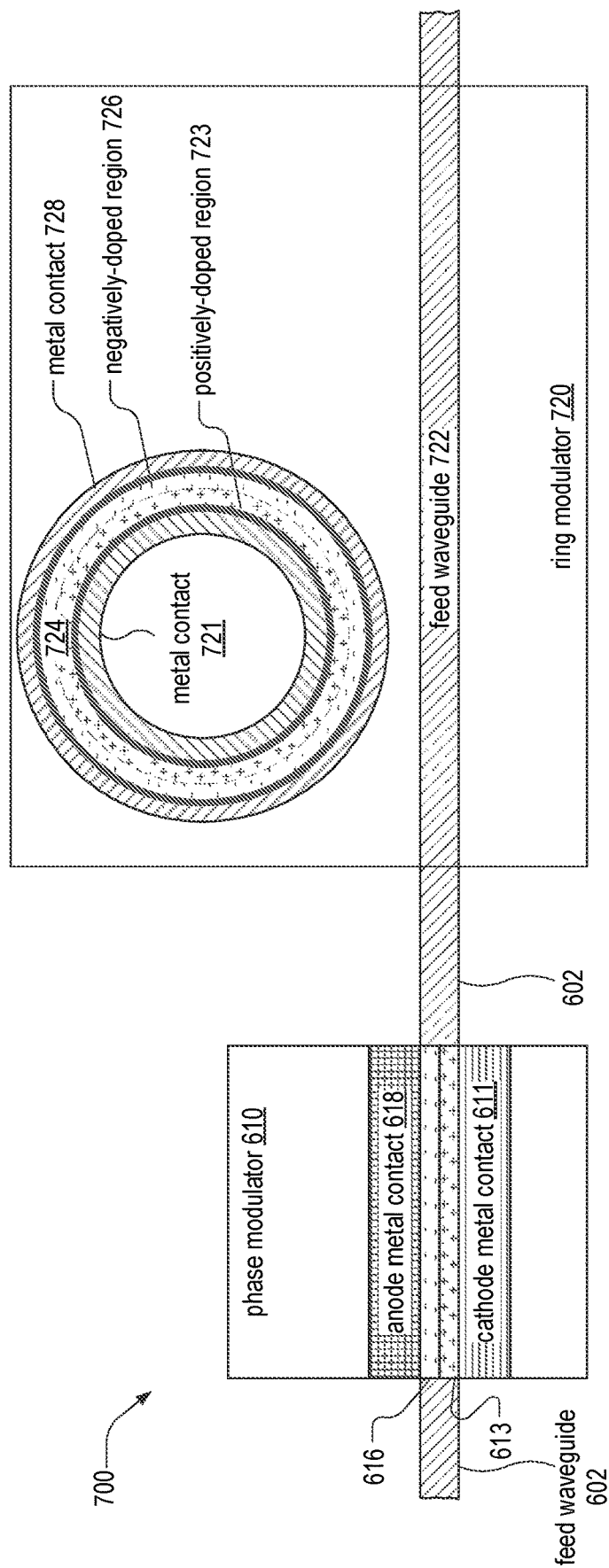

FIG. 7 is a schematic plan view of a cascaded modulator 700, which includes phase modulator 610 and a ring modulator 720 optically coupled in series. Cascaded modulator 700 and ring modulator 720 are respective examples of cascaded modulator 248 and intensity modulator 246 of electro-optic frequency-comb source 240, FIG. 2. Ring modulator 720 includes a feed waveguide 722, a closed-loop waveguide 724 evanescently coupled thereto, an inner metal contact 721 adjacent to an inner surface of closed-loop waveguide 724, and an outer metal contact 728 adjacent to an outer surface of closed-loop waveguide 724. Feed waveguide 722 may be a section of feed waveguide 602.

Closed-loop waveguide 724 includes a positively-doped region 723 and a negatively-doped region 726 that surrounds positively-doped region 723. Doped regions 723 and 726 form a pn junction for modulating the change in refractive index of closed-loop waveguide 724. In operation, pn junction may be either forward-biased or reverse-biased. In embodiments, locations of doped regions 723 and 726 are switched, such that negatively-doped region 723 surrounds positively-doped region 726. In embodiments, inner metal contact 721 and outer metal contact 728 function either as (i) a cathode and an anode respectively, and (ii) an anode and a cathode respectively.

Figure 8:
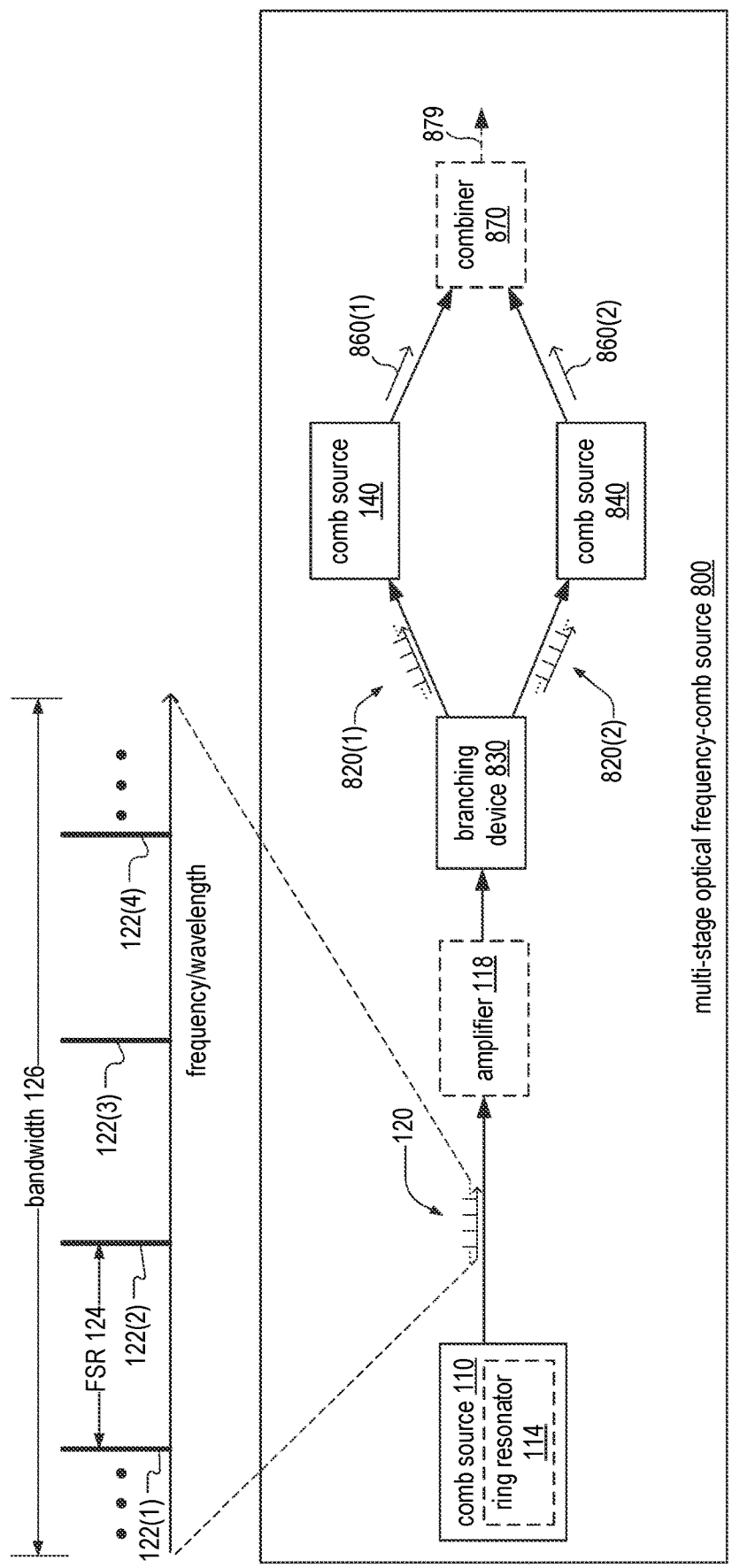
FIG. 8 is a schematic of an optical frequency-comb source, which is an example of the optical frequency-comb source of FIG. 1.

FIG. 8 is a schematic of an optical frequency-comb source 800, which is multi-stage comb source 100 with an additional optical frequency-comb source 840, which is similar to comb source 140. Optical frequency-comb source 800 includes a branching device 830 optically coupled to comb source 110, which may be one of a de-interleaver, a wavelength demultiplexer, and a wavelength selective switch. Each of comb sources 140 and 840 is optically coupled to branching device 830. Branching device 830 splits optical frequency comb 120 into multiple branch combs 820(1) and 820(2), which may be manipulated independently by optical frequency-comb sources 140 and 840, respectively. Comb sources 140 and 840 generate respective optical frequency-combs 860(1) and 860(2), each of which is an example of optical frequency-comb 160.

Optical frequency-comb source 800 may include a combiner 870, which combines optical frequency-combs 860 to yield a combined optical frequency-comb 879. Combiner 870 may be a multiplexer, an interleaver, or an optical combiner. In an example use scenario, optical frequency-combs 860(1) and 860(2) have different tone spacings. For example, frequency combs 860 (1,2) may have respective frequency spacings of 25 GHz and 75 GHZ, though the larger frequency spacing need not be an integer multiple of the smaller frequency spacing. The different tone spacings increases number of candidate receiver types that may be used to detect respective spectral regions of combined optical frequency-comb's optical bandwidth.

FIG. 9 is a flowchart illustrating a method 900 for generating an optical frequency comb. Method 900 may be implemented by multi-stage comb source 100. Method 900 includes steps 910 and 920.

Step 910 includes generating a first optical frequency comb spanning a first optical bandwidth and including a first plurality of frequency tones spaced by a free-spectral range. In an example of step 910, comb source 110 generates optical frequency comb 120.

Step 910 may include step 912. Step 912 includes exciting a plurality of cavity modes of an optical resonator formed at least in part from a third-order nonlinear optical material. In an example of step 912, laser 212 of multi-stage comb source 200, FIG. 2, excites a plurality of cavity modes of optical resonator 114.

Step 920 includes generating an additional optical frequency comb from a first frequency tone of the first plurality of frequency tones. In an example of step 920, comb source 140 generates, from one of frequency tones 122, one of optical frequency combs 150. Step 920 may include a step 921, which includes generating, from each of the first plurality of frequency tones, a respective one of a plurality of second optical frequency combs. In an example of step 921, comb source 140 generates, from each frequency tone 122 ($k$), a respective optical frequency comb 150 ($k$), where index k is an integer.

Step 920 may include at least one of steps 922, 924, 926, and 928. Step 922 includes coupling the first optical frequency comb to an input port of an electro-optic frequency-comb source. In an example of step 922, comb source 110 is coupled to comb source 140 via an optical fiber or through free space. Comb source 110 may be indirectly coupled to comb source 140, e.g., via amplifier 118.

Step 924 includes driving an electro-optic modulator of the electro-optic frequency-comb source with a periodic signal having a modulation frequency that is a unit fraction of, and does not exceed, one-half of the free-spectral range. In an example of step 924, RF source 242 of multi-stage comb source 200, FIG. 2, drives phase modulator 244 and intensity modulator 246 with a periodic signal that has a frequency equal to frequency spacing 154 of optical frequency comb 150.

Step 926 includes amplifying the first optical frequency comb to yield a first plurality of amplified frequency tones. In an example of step 926, amplifier 118 of multi-stage optical frequency-comb source 100, FIG. 1, amplifies optical frequency comb 120 to yield amplified frequency tones 132 of optical frequency comb 130.

Step 928 includes generating, from each of the first plurality of amplified frequency tones, a respective one of the plurality of second optical frequency combs. In an example of step 928, comb source 140 generates, from each amplified frequency tone 132, a respective adjacent optical frequency comb 150.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. An optical frequency-comb source comprising:
    an optical resonator including a feed waveguide and a closed-loop waveguide evanescently coupled to the feed waveguide;
    a first active-region waveguide, formed of a first gain medium, and optically coupled to an entrance port of the feed waveguide; and
    a second active-region waveguide, formed of a second gain medium, and optically coupled to an exit port of the feed waveguide;
    wherein an end of the first active-region waveguide faces the entrance port of the feed waveguide.

2. The optical frequency-comb source of claim 1, the closed-loop waveguide being formed at least in part of a third-order nonlinear optical material.

3. The optical frequency-comb source of claim 1, further comprising an optical amplifier that includes the first active-region waveguide.

4. The optical frequency-comb source of claim 3, the optical amplifier being a semiconductor optical amplifier.

5. The optical frequency-comb source of claim 3, the optical amplifier being one of an erbium-doped fiber amplifier and a Raman amplifier.

6. The optical frequency-comb source of claim 1, further comprising an optical amplifier that includes the second active-region waveguide.

7. The optical frequency-comb source of claim 1, further comprising an electro-optic frequency-comb source optically coupled to the second active-region waveguide.

8. The optical frequency-comb source of claim 7, the electro-optic frequency-comb source including a phase modulator optically coupled to an intensity modulator, the phase modulator including an input port optically coupled to the second active-region waveguide, and an output port coupled to the intensity modulator.

9. The optical frequency-comb source of claim 8, the intensity modulator including one of a Mach-Zehnder interferometer and a ring modulator.

10. The optical frequency-comb source of claim 1, further comprising:
a substrate formed of an electrical insulator and having a substrate top-surface, at least one of the optical resonator, the first active-region waveguide, and the second active-region waveguide being formed on the substrate top-surface.

11. The optical frequency-comb source of claim 1, the optical resonator being one of a Fabry-Perot resonator and a microring resonator.

12. An optical frequency-comb source comprising:
a substrate formed of an electrical insulator;
an optical resonator including a feed waveguide and a closed-loop waveguide evanescently coupled to the feed waveguide;
a first active-region waveguide, formed of a first gain medium, and optically coupled to an entrance port of the feed waveguide; and
a second active-region waveguide, formed of a second gain medium, and optically coupled to an exit port of the feed waveguide;
the first active-region waveguide and the feed waveguide being coplanar in a plane parallel to a top surface of the substrate.

13. An optical frequency-comb source comprising:
an optical resonator including a feed waveguide and a closed-loop waveguide evanescently coupled to the feed waveguide;
a first active-region waveguide, formed of a first gain medium and optically coupled to an entrance port of the feed waveguide via a taper/inverted-taper geometry; and
a second active-region waveguide, formed of a second gain medium, and optically coupled to an exit port of the feed waveguide.

* * * * *